3,135,707
POLYURETHANE FOAM COMPOSITIONS MODIFIED WITH PARTIALLY ALKYLATED POLYMETHYLOLMELAMINES
Arthur S. Nyquist, Darien, and Norman G. Britt, Westport, Conn., assignors to American Cyanamid Company, New York, N.Y., a corporation of Maine
No Drawing. Filed Feb. 2, 1961, Ser. No. 86,588
8 Claims. (Cl. 260—2.5)

This invention relates to novel solid foams derived from partially alkylated polymethylolmelamines. More particularly, this invention relates to novel, modified polyurethane foam systems which comprise a partially alkylated polymethylolmelamine, a polyfunctional polyol, and an organic polyisocyanate and which are capable of producing cellular, expanded, thermoset products having marked heat-resistance. This invention further relates to methods of preparing said heat-resistant cellular products.

Solid foams, both rigid and non-rigid, derived from a wide variety of material, e.g., cellulose acetate, polystyrene, and phenol-formaldehyde, urea-formaldehyde, and melamine-formaldehyde condensates, have gained widespread recognition in recent years. For example, many types of rigid foams have been used in large quantities in thermal and acoustical insulating compositions, in packaging, to cushion against impact shock, and in a wide variety of more limited applications. Unfortunately, however, all such foamed materials have at least one undesirable property which precludes their use in many important areas, despite many attempts by the prior art to overcome such deficiencies. An example in point with the subject matter of the present invention is the behavior of resin foams prepared from known polyurethane compositions towards heat.

A finished foam which has good dimensional stability at elevated temperatures, i.e., a foam having the ability to maintain good mechanical properties while resisting substantial degradation (loss of weight and volume), embrittlement, loss of form, distortion, cracking, etc., under such conditions, is said to have good heat-resistance. Resin foams prepared from known polyurethane compositions, such as polyester-polyisocyanate and poly-ether-polyisocyanate compositions, lack these important properties at elevated temperatures, e.g., 300° F., even when they are used in applications wherein they are under no significant stress. This failing is even more pronounced in load-bearing foams of this type, which fail at temperatures as low as 250° F. Thus, foams such as these are unacceptable for numerous applications wherein good heat-resistance at temperatures of the order indicated is highly desirable or, in many cases, absolutely necessary.

As previously mentioned, attempts have been made by those skilled in the art to overcome this deficiency, but in general, it can be stated that such attempts, especially those involving chemical modifications, have not met with unqualified success, in that introduction of various agents to improve one or more properties of these foams has, at the same time, usually resulted in a loss of other important properties. However, many attempts made to overcome such deficiencies have been confined to the manipulative steps employed in the production of the foams themselves, and it is contemplated that the best of these procedures may be appropriated to the production of the resin foams of the present invention. Nevertheless, it should be noted that the improvements realized through the practice of the present invention are fundamentally related to the nature of the modified polyurethane compositions themselves, and more particularly, to the nature of the partially alkylated polymethylolmelamines which we employ in the preparation of our cellular, expanded, thermoset products.

We have now discovered that modified polyurethane foams comprising a partially alkylated polymethylolmelamine, a polyfunctional polyol, and an organic polyisocyanate show considerable improvement in heat-resistance over known polyuprethane foams but still possess, to the same extent, the desirable properties, e.g., impact-resistance, found in known polyurethane foams.

It is, therefore, an object of our invention to derive cellular, expanded, thermoset products from a combination of reactants comprising a partially alkylated polymethylolmelamine, a poly functional polyol, and an organic polyisocyanate.

A further object of our invention is the use of our novel foams prepared from said combination of reactants in applications wherein heat-resistance is of prime importance.

These and other objects of our invention will be discussed more fully hereinbelow.

Partially alkylated polymethylolmelamines of the type employed in the practice of the present invention are well known in the art. Conventionally, their preparation involves the steps of reacting melamine with aqueous formaldehyde to form polymethylolmelamines, removing the bulk of the water from the polymethylolmelamines, and thereafter reacting the polymethylolmelamines with a lower alkanol, under acidic conditions, to form the partially alkylated polymethylolmelamines. In addition, various modifications and improvements of this basic process have been developed. Modifications of the type commonly employed in commercial practice are shown, for example, in U.S. Patent No. 2,715,619 to Suen et al. and also in U.S. Patent No. 2,918,452 to Kun et al.

The partially alkylated polymethylolmelamines which we employ in the practice of our invention constitute those having the general formula:

$$MF_xA_y$$

wherein M represents melamine, $F_x$ represents the degree to which the melamine has been methylolated, and $A_y$ represents the degree to which the methylolated melamine has been alkylated, $x$ being a number between about 4.5 and 6 and $y$ being a number from about 3.0 to 4.5, such that $x-y$ is at least about 1.2. Thus, a partially alkylated polymethylolmelamine composition used in preparing our modified polyurethane foam syssystems will be comprised of melamine molecules having, on the average, from about 4.5 to 6 methylol groups per molecule, of which, on the average from about 3 to 4.5 are etherified with a lower alkanol, such as methanol, ethanol, propanol, butanol, and the like, with the proviso that there are, on the average, at least about 1.2 more free methylol groups than there are etherified methylol groups per melamine molecule in said partially alkylated polymethylolmelamine composition. The free methylol groups present in said composition serve to provide sufficient functionality so that a resinous reaction product may be obtained, while the presence of the required number of etherified methylol groups imparts sufficient compatibility to the partially alkylated polymethylolmelamine composition so that reaction between it and the remaining reactanats may readily take place. Therefore, both the balance between free and etherified methyloy groups and the presence of at least the minimum number of said etherified groups as specified above must be observed in order to prepare modified polyurethane foams having the desired characteristics.

The polyfunctional polyols employed in the practice of our invention are also well known in the art. Thus, we may use any polyfunctional polyol or mixture of polyfunctional polyols which is compatible with the partially alkylated polymethylolmelamine and organic polyisocyanate reactants and which is also a liquid at the temperature at which the reaction is carried out, i.e., at mixing temperature, usually from about 15–35° C. or slightly higher (spontaneous exotherm will usually occur at between about 15° C. and 160° C. in the center of the foamed mass). Usually, those polyfunctional polyols having molecular weights ranging from at least about 200 to 4000 will be preferred, inasmuch as they are liquids at temperatures within the usual range of reaction temperatures, but polyfunctional polyols having even higher molecular weights may also be employed, since the upper limit of the molecular weight range is, in effect, only governed by the physical state of the polyol at reaction temperature and its compatibility with the remaining reactants.

Among the polyfunctional polyols which may be employed there are included the polyalkylene ether polyols such as polyethylene glycols, polypropylene glycols, polybutylene glycols, polytetramethylene glycols, polyhexamethyene glycols, and the like, which are the condensation products of lower alkylene oxides, such as ethylene oxide, propylene oxide, and the like, either with themselves or with substances such as polyhydric alcohols, e.g., ethylene glycol, propylene glycol, glycerol, trimethylol propane, sorbitol, and the like. Polyamino alcohols of sufficient molecular weight may also be employed. Examples of such polyamino alcohols include compounds such as "Quadrol" (or N,N,N′,N′-tetrakis (2-hydroxypropyl)-ethylene diamine) and higher analogs thereof, such as

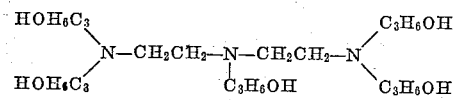

(see U.S. Patent No. 2,697,118). Many well known commercially available polyalkylene ether glycols having sufficiently high molecular weights, as well as mixtures thereof, are also included among the operable polyfunctional polyols. In addition, blends of two or more of such polyalkylene ether glycols may be employed in the practice of our invention.

Linear polyesters form another class of suitable polyfunctional polyols which may be employed in the practice of our invention. While the preparation of polyesters suitable for use in polyurethane compositions in general has been amply described in the prior art, and forms no part of the present invention per se, it may be mentioned here by way of illustration that suitable polyesters include the linear polymeric polyesters (alkyds) prepared from one or more glycols and one or more saturated polycarboxylic acids, an excess of glycol over acid being used to insure that the resulting linear polymeric polyester chains are terminated predominantly by alcoholic hydroxyl groups. In addition to the glycol material, small amounts of tri- or tetrafunctional materials, e.g., tri- or tetrahydric alcohols such as trimethylolpropane, pentaerythritol, and the like, may also be employed in preparing the polyester.

Polyesters suitable for use in the practice of our invention will have relatively low acid numbers, e.g., not appreciably in excess of 60 and, preferably, as low as it is practicable to obtain, e.g., 2 or less. Correspondingly, they will have relatively high hydroxyl numbers, e.g., from about 50 to 700, with hydroxyl numbers ranging from about 300 to 700 being preferred for the preparation of more rigid foams.

Among the polycarboxylic acids which may be employed there are included aliphatic dicarboxylic acids having from 3 to 10 carbon atoms, or higher, including such acids as succinic, glutaric, adipic, pimelic, suberic, azelaic, sebacic, malonic, and the like, as well as aryl dicarboxylic acids such as phthalic, isophthalic, terephthalic, hexahydroterephthalic, p-phenylene diacetic, and the like, or their homologs, chloro derivatives, etc., wherein substitution, if any, involves one or more ring positions. The anhydride forms of any of the above acids, if available, may be employed in place of or together with the acids themselves.

At least a portion of the saturated polycarboxylic acid component of the linear polymerized polyester may be replaced by one or more aliphatic polycarboxylic acids containing α,β-ethylenic unsaturation, such as maleic acid, fumaric acid, itaconic acid, aconitic acid, and the like, as well as their homologs, analogs, and, if available, their anhydrides.

Any of the polyalkylene ether glycols mentioned above may be employed to prepare the linear polymeric polyester reactant, the only limitation on the use of any acid, glycol, or polyester prepared therefrom again being that it should be a liquid at reaction temperature.

Mixtures of one or more of the aforementioned polyalkylene ether glycols with one or more linear polymeric polyester may also be employed as the polyfunctional polyol component of our novel, modified polyurethane compositions.

Any of a wide variety of organic polyisocyanates may be used in preparing our novel polyurethane compositions. Aromatic diisocyanates, such as toluene diisocyanate (either as a mixture of isomers or as the individual isomers themselves), m- and p-phenylene diisocyanates, m- and p-xylylene diisocyanates, 4,4′-methylenebis(phenylisocyanate), "bitolylene diisocyanate" (3,3′-dimethyl-4,4′-biphenylene diisocyanate), "dianisidine diisocyanate" (3,3′-dimethoxy-4,4′-biphenylene diisocyanate), 1,5-naphthalene diisocyanate, polymethylene polyisocyanates of the structural formula:

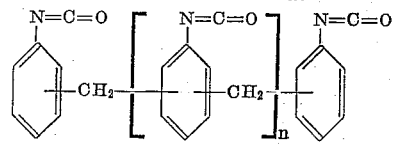

wherein $n$ represents an integer between 0 and about 5, and the like, are preferred, but we may also use aliphatic polyisocyanates such as the tetra-, penta-, hexa-, hepta-, and octamethylene ω,ω′-diisocyanates, and the like, alicyclic polyisocyanates, such as 1,4-cyclohexylene diisocyanate, and the like, and tri- and higher isocyanates, such as benzene triisocyanate, p,p′,p″-triphenylmethane triisocyanate, and the like. Mixtures of two or more of such organic polyisocyanates may also be employed.

Foams may be prepared from our novel, modified polyurethane foam systems by any of several methods. In carrying out any of these, the amounts of partially methylolated polymethylolmelamine and polyfunctional polyol employed are not critical. Thus, the amounts of such of these reactants which may be present may range from about 80:20 to 20:80 parts by weight, respectively, depending on the particular materials employed and the characteristics desired in the ultimately produced foam. A weight ratio of from about 60 parts by weight of partially alkylated polymethylolmelamine to 40 parts by weight of the polyfunctional polyol constitutes the preferred ratio of these reactants. Parenthetically, it should be noted here that extremely heat-resistant foams may be made from systems of the type described herein but having only the partially alkylated polymethylolmelamine and the polyisocyanate present as reactants. However, such foams are extremely weak and friable, and have no appreciable degree of resilience or impact-resistance.

The amount of organic polyisocyanate employed in our polyurethane systems will generally range from about 30 to 50 parts by weight, based on the total weight of resin-forming constituents present (partially alkylated polymethylolmelamine (polyfunctional polyol, and organic polyisocyanate), if a rigid foam is desired. However, amounts of organic polyisocyanate falling below the above-stated lower limit may also be employed in our polyurethane systems, but in such cases, the resulting foams will have a lower degree of rigidity, and may even, in some cases, be characterized as being flexible.

The presence of amounts of water up to about 1% by weight, based on the total weight of resin-forming constituents present may be tolerated in our polyurethane systems. Larger amounts of water cause an increase in density and non-homogeneity in the foamed products. Thus, a substantially non-aqueous system is preferred.

One suitable method of preparing foams from our novel, modified polyurethane foam systems involves the steps of:

(1) Blending the partially alkylated polymethylolmelamine and polyfunctional polyol together at room temperature (the resulting mixture constitutes a physical admixture of reactable constituents rather than a reaction product or "pre-polymer"), (2) Adding a suitable foaming catalyst, either alone or in admixture with a surface-active emulsifying agent, to the blend of partially alkylated polymethylolmelamine and polyfunctional polyol, and, (3) Adding the polyisocyanate component at room temperature, mixing the components, using any suitable mixing means, e.g., either a mixer designed for batch operations, such as a Hamilton-Beach mixer, or any suitable continuous mixing device, for from about 2 to 20 seconds, and transferring the resulting mixture to a suitable container; wherein foaming and expansion to a hard, rigid foam will occur almost immediately.

It will be readily understood by those skilled in the art that heating is not required in order to prepare our novel, modified polyurethane foams, inasmuch as merely mixing the organic polyisocyanate with the remaining reactants will cause a spontaneous exotherm, generating sufficient heat to cause the formation of a solid, rigid foamed mass.

In a modification of this process, the partially alkylated polymethylolmelamine and polyfunctional polyol may be "pre-cooked," e.g., at temperatures ranging from about 100–120° C. for periods of time ranging from about 4–48 hours, before the addition of catalyst, surface-active emulsifying agent, and polyisocyanate. Foams prepared in this manner show improvements with respect to water-absorption, possibly due to an increase in the number of closed cells formed.

Any of the foaming catalysts conventionally employed in the preparation of polyurethane resin foams may be employed in the practice of the present invention. Among such catalysts there are included nitrogeneous bases such as the N-alkylmorpholines, e.g., N-methylmorpholine, N-ethylmorpholine, and the like, pyridine, N,N-dimethylpiperazine, tertiary amines such as triethylamine and the like, tetraalkylguanidines such as tetramethyl- and tetraethylguanidine, alkylene polyamines such as triethylene diamine and the like, tin salts, such as stannous laurate, stannous octoate, dibutyl tin dilaurate, dibutyl tin di-2-ethylhexoate, and the like. The amount of catalyst employed will generally range from about 0.1% to 5%, by weight, based on the total weight of resin-forming constituents present.

The surface-active emulsifying agent which may be added to the blend of partially alkylated polymethylolmelamine and polyfunctional polyol chiefly serves to insure complete dispersion of these reactants during the relatively short mixing cycle. The degree of dispersion obtained influences the structure of the cells formed in the resin foam, i.e., the ratio of open to closed cells, and also influences their size. Good heat-resistance is obtained from foams prepared in accordance with our invention which have small, closed cells, and the preparation of such foams is facilitated by the presence of a surface-active emulsifying agent. However, the presence of such an agent is not always essential to the preparation of acceptable foams. Any suitable surface-active emulsifying agent may be employed in the practice of the present invention. Among such emulsifiers there are included polyoxyethylated vegetable oils such as Emulphor 719, a polyethylene glycol ricinoleate manufactured and sold by General Aniline & Film Corp., water-soluble organo-silicone copolymers, such as L–520 and L–521, manufactured and sold by Union Carbide Chemicals Company, Dow Corning DC–199, a silicone-glycol copolymer, and the like. If a surface-active emulsifying agent is to be employed, the amount thereof can be varied depending on a number of factors, such as, for example, the nature of the emulsifying agent itself, but in general, it may be stated that the usual amount of the more common emulsifiers which will be employed ranges from about 0.5 to 2%, by weight, based on the total weight of partially alkylated polymethylolmelamine and polyfunctional polyol employed.

Among the optional variations which may be practiced in the method outlined above for preparing foams from our novel, modified polyurethane foam systems there are included:

(1) adding catalyst, alone or together with surface-active emulsifying agent, at the time that either the partially alkylated polymethylolmelamine or the polyfunctional polyol, or both of these, are added, rather than after these two components have been blended together;

(2) adding all three reactive components (partially alkylated polymethylolmelamine, polyfunctional polyol and organic polyisocyanate), together with catalyst, alone or together with surface-active emulsifying agent, simultaneously to a suitable mixing device;

(3) dispersing an inert liquid, such as a halogenated hydrocarbon, e.g., Freon 11 (trichloromonofluoromethane), dichlorodifluoromethane, monochlorodifluoromethane, trichlorotrifluoroethane, dichlorotetrafluoroethane, and the like, having a boiling point such that it will vaporize at reaction temperature, in the mixture of partially alkylated polymethylolmelamine and polyfunctional polyol, prior to foaming, i.e., prior to the introduction of organic polyisocyanate, thus producing at reaction temperature a gas which supplements the foaming reaction.

The amount of inert liquid employed may, of course, be varied within a wide range, depending on such factors as the nature of the inert liquid itself, the foam density desired, etc., and thus, this amount is not critical. For example, one may employ 20–30 parts by weight of a halogenated hydrocarbon such as Freon 11 per 100 parts by weight of the mixture of partially alkylated polymethylolmelamine and polyfunctional polyol to be foamed.

Another suitable method of preparing foams from our novel, modified polyurethane foam systems involves the initial preparation of a "pre-polymer" through co-reaction of the polyfunctional polyol and organic polyisocyanate components. In carrying out this "pre-polymer" preparation, the details of which are well known to those skilled in the art, the polyfunctional polyol and organic polyisocyanate components are introduced into a suitable reaction vessel, with stirring, and reacted together under suitable conditions of time and temperature, e.g., from about 30 minutes to 3 hours or more at from about 100–200° C. After cooling the "pre-polymer" mixture to about 15–25° C., the partially alkylated polymethylolmelamine component is introduced, together with catalyst and, if desired, surface-active emulsifying agent, and the resulting mixture is further mixed for from about 2 to 20 seconds. The mixture is then transferred to a suitable container, wherein foaming and expansion to a hard, rigid foam occurs almost immediately.

While carrying out any of the foaming methods described above, particulate or fibrous fillers, such as α-cellulose, asbestos, and the like, conventional fire-retarding additives, for example phosphates such as triphenyl phosphate, tricresyl phosphate, and the like, halogenated phosphates such as tris (2,3-dibromopropyl)phosphate, tris (β-chloroethyl)phosphate, and the like, pigments, for example silica pigments, dyes, and the like may be added to the polyurethane foam systems at any stage prior to the actual foaming thereof.

As was indicated above, our novel, modified polyurethane foams show considerable improvement in heat-resistance over known polyurethane foams but still possess, to the same extent, the many desirable properties, e.g., impact-resistance, found in the known polyurethane foams. Thus, our foams may be employed in any of the areas where rigid foams having the properties of the known polyurethane foams are currently employed, e.g., in packaging, to cushion against impact shock, but they are especially suitable for use in those areas where heat-resistance, either by itself or coupled with load-bearing qualities, is of prime importance, e.g., in all types of thermal insulation.

In order that those skilled in the art may more fully understand the inventive concept presented herein, the following illustrative examples are set forth. These examples are given solely by way of illustration and should not be considered as expresing limitations unless so set forth in the appended claims. All parts and percentages are by weight, unless otherwise stated.

EXAMPLE I 360 parts of a partially methylated polymethylolmelamine composition wherein the melamine had, on the average, 5.2 methylol groups, 3.9 of which, on the average, had been etherified with methanol, 120 parts of Niax diol 2025 (a propylene oxide adduct of propylene glycol having a molecular weight of 2025), 120 parts of Niax triol LHT–42 (a propylene oxide adduct of hexanetriol having a molecular weight of 4000), 1.8 parts of a silicone surfactant (DC–199), Dow Corning Corp.), and 0.9 part of triethylene diamine were blended together in a suitable reaction vessel having stirring means. 432 parts of toluene diisocyanate (mixed isomers, 80% by weight of the 2,4-isomer, 20% by weight of the 2,6-isomer) were then added and the reaction mixture was stirred for 15 seconds. At this point, the mixture was quickly transferred to a polyethylene-lined container (17″ x 17″ x 3½″). The mixture reacted exothermically and on rapid free expansion produced a hard, rigid foam having a density of 2.1 lbs. per cubic foot.

In order to illustrate the outstanding heat-resistance of foams prepared according to the present invention, samples of the foam prepared in Example I and two commercially available polyurethane foams were exposed to a temperature of 200° C. for one hour in a circulating air oven. The effect of this exposure is given in the following table.

*Table I*

| Foam | Percent Weight Loss | Percent Volume Loss | Remarks |
| --- | --- | --- | --- |
| Example I | 10 | 3 | No distortion or cracking. |
| Foam A | 1 | 15 | Severe distortion. |
| Foam B | 14 | 6 | Cracked. |

Foams A and B hereinabove are commercially available polyether-toluene diisocyanate urethane foams, halocarbon blown.

As can be seen from the results given above, the foam prepared according to the present invention exhibited improved dimensional stability and freedom from cracking despite some slight weight and volume losses.

EXAMPLE II

The procedure of Example I was repeated with the exception that a partially methylated polymethylolmelamine composition wherein the melamine had, on the average, 5.7 methylol groups, 4.5 of which, on the average, had been etherified with methanol, was employed. A hard, rigid, uniform foam having a density of 2 lbs. per cubic foot resulted.

EXAMPLE III

The procedure of Example I was repeated with the exception that a partially methylated polymethylolmelamine composition wherein the melamine had, on the average, 5.1 methylol groups, 3 of which, on the average, had been etherified with methanol, was employed. A hard, rigid, uniform foam having a density of 4 lbs. per cubic foot was obtained.

EXAMPLE IV

In order to illustrate the criticality of the limits set forth for the degree of methylolation and alkylation, two runs were made in the manner of Example I, using two partially methylated polymethylolmelamine compositions wherein the melamine in the first case had, on the average, a methylol content of 3 and, on the average, 2 of these methylol groups methylated and in the second case, wherein the melamine had, on the average, 5.7 methylol groups, of which an average of 5.4 were methylated. In the first case, the initial reaction mixture prepared was opaque and grainy, due to the incompatibility of the partially methylated polymethylolmelamine composition, and was unsuitable for foaming. In the second case, a clear, compatible mixture was obtained. However, this mixture showed a low degree of reactivity, i.e., the foaming atcion was slow and a non-uniform foam of high density was obtained.

EXAMPLE V 120 parts of the partially methylated polymethylolmelamine employed in Example I, 40 parts of Niax diol 2025, 40 parts of Niax triol LHT–42, 2 parts of the silicone surfactant employed in Example I, 0.4 part triethylene diamine, and 52 parts of tris (dibromopropyl)-phosphate were blended in a suitable reaction vessel equipped with stirring means. 155 parts of toluene diisocyanate (mixed isomers, as in Example I) were then added, with stirring (Hamilton-Beach mixer) being continued for 15 seconds. The mixture was then quickly transferred to a suitable container, where foaming and expansion occurred rapidly, giving a hard, rigid foam having a density of 2.2 lbs. per cubic foot. This foam, together with two other commercially available polyurethane foams, was tested for flammability by the procedure outlined in the A.S.T.M. Standard on Plastics, D–1692–59T. The results of this test are summarized in the following table.

*Table II*

| Foam | Density [1] | Burning Rate [2] | Remarks |
| --- | --- | --- | --- |
| Example IV | 2.2 | <1 | Self-extinguishing, charred, no melting. |
| Foam C | 2.5 | <1 | Self-extinguishing, but charred, melted and dripped away. |
| Foam A | 2.6 | 4.6 | Flammable. |

[1] In lbs./cu.ft.
[2] In inches/minute.

Foam C is a commercially available fire-resistant foam similar in composition to foams A and B (identified in Table I).

As a footnote to these results, it should be noted that a foam which melts under the influence of heat, even though self-extinguishing, would not be ideally suited for applications wherein it would be required to maintain support or hold its shape if exposed to high temperatures or flame.

EXAMPLE VI

This example illustrates the use of a halogenated hydrocarbon as an added blowing agent. 360 parts of the partially methylated polymethylolmelamine employed in Example I, 180 parts of Niax triol LHT–240 (a propylene oxide adduct of hexanetriol having a molecular weight of 700), 60 parts of Quadrol [N,N,N′,N′-tetrakis (2-hydroxypropyl)-ethylene diamine], 1.2 parts of the silicone surfactant employed in Example I, 0.9 part of triethylene diamine, and 120 parts of Freon 11 (trichloromonofluoromethane) were blended together in a suitable reaction vessel equipped with a Hamilton-Beach mixer. 432 parts of the mixed isomers of toluene diisocyanate used in Example I were then added, the mixture stirred for 15 seconds, and the contents of the reaction vessel quickly transferred to a suitable container, where foaming and expansion occurred rapidly to give a hard, rigid foam having a density of 1.3 lbs. per cubic foot and a compression strength of 11 lbs. per square inch.

EXAMPLE VII

A polyether-urethane "pre-polymer" was first prepared by blending together, in a suitable reaction vessel equipped with stirring means, 100 parts of Niax diol 2025, 100 parts of Niax triol LHT–42, and 200 parts of toluene diisocyanate (mixed isomers, as in Example I). 50 parts of this "pre-polymer" were then mixed with 31 parts of the partially methylated polymethylolmelamine employed in Example I and 1 part of N-methylmorpholine and allowed to remain in the mixing container. A spontaneous exotherm and foaming of the mass occurred, forming a tough, rigid foam having a density of approximately 4 lbs. per cubic foot. This foam withstood repeated hammer blows without shattering.

EXAMPLE VIII 40 parts of Paraplex U–148,[1] 60 parts of the partially methylated polymethylolmelamine employed in Example I, 1 part XL–521 silicone surfactant (a glycolated silicone oil manufactured by Union Carbide Chemicals Company), and 0.1 part triethylene diamine were blended in a suitable reaction vessel equipped with stirring means. 72 parts of toluene diisocyanate (mixed isomers, as in Example I) were then added to the blend, yielding, after spontaneous exotherm, a rigid, small-celled foam having a density of 2.2 lbs. per cubic foot.

It will be obvious that other changes and variations may be made in carrying out the present invention without departing from the spirit and scope thereof as defined in the appended claims.

We claim:

1. A heat-resistant cellular resinous article which comprises the product prepared by reacting (A) a partially alkylated polymethylolmelamine composition, the melamine molecules of which contain, on the average, from about 4.5 to 6 methylol groups of which, on the average, from about 3 to 4.5 are etherified with a lower alkanol, there being present in said composition, on the average, at least 1.2 more free methylol groups than there are etherified methylol groups per melamine molecule, (B) a polyfunctional polyol which has a molecular weight of at least about 200 and which is also a liquid at reaction temperature, selected from the group consisting of (1) linear polymerized polyesters having acid numbers not appreciably in excess of about 60 and hydroxyl numbers of from about 50 to 700, (2) polyalkylene ether glycols and (3) N,N,N′,N′-tetrakis (2 - hydroxypropyl) - ethylene diamine, and (C) an organic polyisocyanate, the weight ratio of (A) to (B) being from about 80:20 to 20:80, respectively, and the amount of (C) present being from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to spontaneous exotherm temperature.

2. A heat-resistant cellular resinous article which comprises the product prepared by reacting (A) a partially alkylated polymethylolmelamine composition, the melamine molecules of which contain, on the average, from about 4.5 to 6 methylol groups of which, on the average from about 3 to 4.5 are etherified with a lower alkanol, there being present in said composition, on the average, at least 1.2 more free methylol groups than there are etherified methylol groups per melamine molecule, (B) a polyalkylene ether glycol which has a molecular weight of at least about 200 and which is also a liquid at reaction temperature, and (C) an organic polyisocyanate, the weight ratio of (A) to (B) being from about 80:20 to 20:80, respectively, and the amount of (C) present being from about 30 to 50 parts by weight, based on the total weight of (A), (B) and (C), in the presence of (D) from about 0.1–5% by weight, based on the total weight of (A), (B) and (C), a foaming catalyst, and allowing the reaction to proceed to spontaneous exotherm temperature.

3. A heat-resistant cellular resinous article which comprises the product prepared by reacting (A) a partially alkylated polymethylolmelamine composition, the melamine molecules of which contain, on the average, from about 4.5 to 6 methylol groups of which, on the average, from about 3 to 4.5 are etherified with a lower alkanol, there being present in said composition, on the average, at least 1.2 more free methylol groups than there are etherified methylol groups per melamine molecule, (B) a linear polymerized polyester which has an acid number not appreciably in excess of 60, a hydroxyl number of from about 100 to 700, a molecular weight of at least about 200 and which is also a liquid at reaction temperature, and (C) an organic polyisocyanate, the weight ratio of (A) to said (B) being from about 80:20 to 20:80, respectively, and the amount of (C) present being from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to spontaneous exotherm temperature.

4. A heat-resistant cellular resinous article which comprises the product prepared by reacting (A) a partially alkylated polymethylolmelamine composition, the melamine molecules of which contain, on the average, from about 4.5 to 6 methylol groups of which, on the average, from about 3 to 4.5 are etherified with a lower alkanol, there being present in said composition, on the average, at least 1.2 more free methylol groups than there are etherified methylol groups per melamine molecule, (B) a polyfunctional polyol which has a molecular weight of at least about 200 and which is also a liquid at reaction temperature selected from the group consisting of (1) linear polymerized polyesters having acid numbers not appreciably in excess of about 60 and hydroxyl numbers of from about 50 to 700, (2) polyalkylene ether glycols and (3) N,N,N′,N′-tetrakis (2-hydroxypropyl)-ethylene diamine, and (C) an organic diisocyanate, the weight ratio of (A) to (B) being from about 80:20 to 20:80, respectively, and the amount of (C) present being from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to spontaneous exotherm temperaure.

5. A heat-resistant cellular resinous article which comprises the product prepared by reacting (A) a partially alkylated polymethylolmelamine composition, the melamine molecules of which contain, on the average, from about 4.5 to 6 methylol groups of which, on the average, from about 3 to 4.5 are etherified with a lower alkanol, there being present in said composition, on the average, at least 1.2 more free methylol groups than there are etherified methylol groups per melamine molecule, (B) a polyalkylene ether glycol which has a molecular weight of at least about 200 and which is also a liquid at reaction temperature, and (C) an organic diisocyanate, the weight ratio of (A) to (B) being from about 80:20 to 20:80, respectively, and the amount of (C) present being

---

[1] An ethylene glycol-adipic acid polyester manufactured by Rohm & Haas Co. to the following specifications:

| | |
|---|---|
| Hydroxyl No. | 60–68. |
| Acid No. | 3 max. |
| Water content | 0.1% max. |
| Equivalent weight | 870. | from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to sponanteous exotherm temperature.

6. A heat-resistant cellular resinous article which comprises the product prepared by reacting (A) a partially alkylated polymethylolmelamine composition, the melamine molecules of which contain, on the average, from about 4.5 to 6 methylol groups of which, on the average, from about 3 to 4.5 are etherified with a lower alkanol, there being present in said composition, on the average, at least 1.2 more free methylol groups than there are etherified methylol groups per melamine molecule, (B) a linear polymerized polyester which has an acid number not appreciably in excess of 60, a hydroxyl number of from about 100 to 700, a molecular weight of at least about 200 and which is also a liquid at reaction temperature, and (C) an organic diisocyanate, the weight ratio of (A) to (B) being from about 80:20 to 20:80, respectively, and the amount of (C) present being from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to spontaneous exotherm temperature.

7. A heat-resistant cellular resinous article which comprises the product prepared by reacting (A) a partially methylated polymethylolmelamine composition, the melamine molecules of which contain, on the average, 5.2 methylol groups of which, on the average, about 3.9 are etherified with methanol, there being present in said composition, on the average, at least 1.2 more free methylol groups than there are etherified methylol groups per melamine molecule, (B) a polyalkylene ether glycol which has a molecular weight of at least about 200 and which is also a liquid at reaction temperature, and (C) toluene diisocyanate, the weight ratio of (A) to (B) being from about 80:20 to 20:80, respectively, and the amount of (C) present being from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to spontaneous exotherm temperature.

8. A heat-resistant cellular resinous article which comprises the product prepared by reacting (A) a partially methylated polymethylolmelamine composition, the melamine molecules of which contain, on the average, 5.2 methylol groups of which, on the average, about 3.9 are etherified with methanol, there being present in said composition, on the average, at least 1.2 more free methylol groups than there are etherified methylol groups per melamine molecule, (B) a linear polymerized polyester which has an acid number not appreciably in excess of 60, a hydroxyl number of from about 100 to 700, a molecular weight of at least about 200 and which is also a liquid at reaction temperature, and (C) toluene diisocyanate, the weight ratio of (A) to (B) being from about 80:20 to 20:80, respectively, and the amount of (C) present being from about 30 to 50 parts by weight, based on the total weight of (A), (B) and (C), in the presence of (D) from about 0.1–5%, by weight, based on the total weight of (A), (B) and (C), a foaming catalyst, and allowing the reaction to proceed to spontaneous exotherm temperature.

References Cited in the file of this patent

UNITED STATES PATENTS

| | | |
|---|---|---|
| 2,764,566 | Simon et al. | Sept. 25, 1956 |
| 2,918,452 | Kun et al. | Dec. 22, 1959 |
| 2,962,183 | Rill et al. | Nov. 29, 1961 |